(12) United States Patent
Appello

(10) Patent No.: US 12,067,904 B2
(45) Date of Patent: Aug. 20, 2024

(54) BISTABLE AUTOMATIC CABLE WRAP, KIT AND ASSEMBLY FOR WRAPPING, MARKING OR PATCHING

(71) Applicant: Tyco Electronics UK Ltd., Swindon (GB)

(72) Inventor: Mario Appello, Marlborough (GB)

(73) Assignee: Tyco Electronics UK Ltd., Swindon (GB)

( * ) Notice: Subject to any disclaimer, the term of this patent is extended or adjusted under 35 U.S.C. 154(b) by 899 days.

(21) Appl. No.: 17/087,200

(22) Filed: Nov. 2, 2020

(65) Prior Publication Data

US 2021/0049936 A1 Feb. 18, 2021

Related U.S. Application Data

(63) Continuation of application No. PCT/EP2019/061163, filed on May 1, 2019.

(30) Foreign Application Priority Data

May 2, 2018 (EP) ..................................... 18170422

(51) Int. Cl.
*G09F 3/00* (2006.01)
*F16L 3/233* (2006.01)
*G09F 3/10* (2006.01)
*H02G 1/00* (2006.01)

(52) U.S. Cl.
CPC ............ *G09F 3/0295* (2013.01); *F16L 3/233* (2013.01); *G09F 3/10* (2013.01); *H02G 1/00* (2013.01); *H02G 2200/20* (2013.01)

(58) Field of Classification Search
CPC ........... G09F 3/0295; G09F 3/10; H02G 1/00; H02G 2200/20; F16L 3/233; B65D 63/10
See application file for complete search history.

(56) References Cited

U.S. PATENT DOCUMENTS

| | | | | |
|---|---|---|---|---|
| 2,975,091 | A * | 3/1961 | Tobey | C09J 7/21 206/460 |
| 8,752,316 | B1 * | 6/2014 | Dipaolo | B62B 9/00 40/661.12 |
| 9,004,514 | B1 * | 4/2015 | McMahon | B62J 15/00 280/852 |
| D761,089 | S * | 7/2016 | Chen | D8/356 |
| 9,541,447 | B2 * | 1/2017 | Daton-Lovett | E21B 47/01 |

(Continued)

FOREIGN PATENT DOCUMENTS

| | | |
|---|---|---|
| CN | 205 396 976 U | 7/2016 |
| GB | 2169456 A | 7/1986 |
| WO | 90/10331 A1 | 9/1990 |

OTHER PUBLICATIONS

EPO Communication, dated Feb. 3, 2021, 9 pages.
(Continued)

*Primary Examiner* — Robert Sandy
*Assistant Examiner* — Louis A Mercado
(74) *Attorney, Agent, or Firm* — Barley Snyder

(57) ABSTRACT

A bistable automatic cable wrap for being wrapped around a cable or wire has a stable extended state in which the bistable automatic cable wrap extends essentially along a longitudinal direction. The bistable automatic cable wrap automatically adopts a stable wound state if deformed in the extended state.

15 Claims, 7 Drawing Sheets

(56) References Cited

U.S. PATENT DOCUMENTS

| | | | |
|---|---|---|---|
| 9,668,550 B2* | 6/2017 | Seo | A44C 5/08 |
| 9,944,111 B2* | 4/2018 | Elmore | B43K 23/00 |
| 2013/0056602 A1* | 3/2013 | Zivku | A47G 29/083 |
| | | | 248/339 |
| 2013/0213428 A1* | 8/2013 | Manno | A45D 8/36 |
| | | | 132/273 |
| 2014/0274614 A1* | 9/2014 | Newman | A63B 21/4035 |
| | | | 482/139 |
| 2015/0119963 A1* | 4/2015 | Cosse | A61F 7/106 |
| | | | 126/263.08 |
| 2015/0165338 A1* | 6/2015 | Choe | A63H 33/18 |
| | | | 446/46 |
| 2015/0332614 A1 | 11/2015 | Rester | |
| 2016/0375295 A1* | 12/2016 | Brasch | A63B 21/0728 |
| | | | 482/107 |
| 2019/0118074 A1* | 4/2019 | Heringer | A63F 3/0023 |
| 2019/0246614 A1* | 8/2019 | Healy, Jr. | A01K 97/00 |
| 2019/0365003 A1* | 12/2019 | Barton | A41D 27/24 |

OTHER PUBLICATIONS

PRWeb, Slap All Of Your Cable Problems, dated Oct. 25, 2012, 2 pages.
PCT Notification, International Search Report and Written Opinion Of The International Searching Authority, dated Jul. 8, 2019, 15 pages.
Panduit: "Cable Ties Product Selection Guide", Dec. 31, 2017, Retrieved from the Internet: URL:http://www.panduit.com/heiler/SelectionGuides/D-CTSG04-SA-ENG-CableTiesProduct-W.pdf, 6 pages.
UT Wire: "Speedy Wrap", Youtube, Jun. 3, 2015, Retrieved from the Internet: URL:https://www.youtube.com/watch?v=nig8FwvyRQ8, 1 page.
Abstract of CN 205 396 976, dated Jul. 27, 2016, 1 page.

* cited by examiner

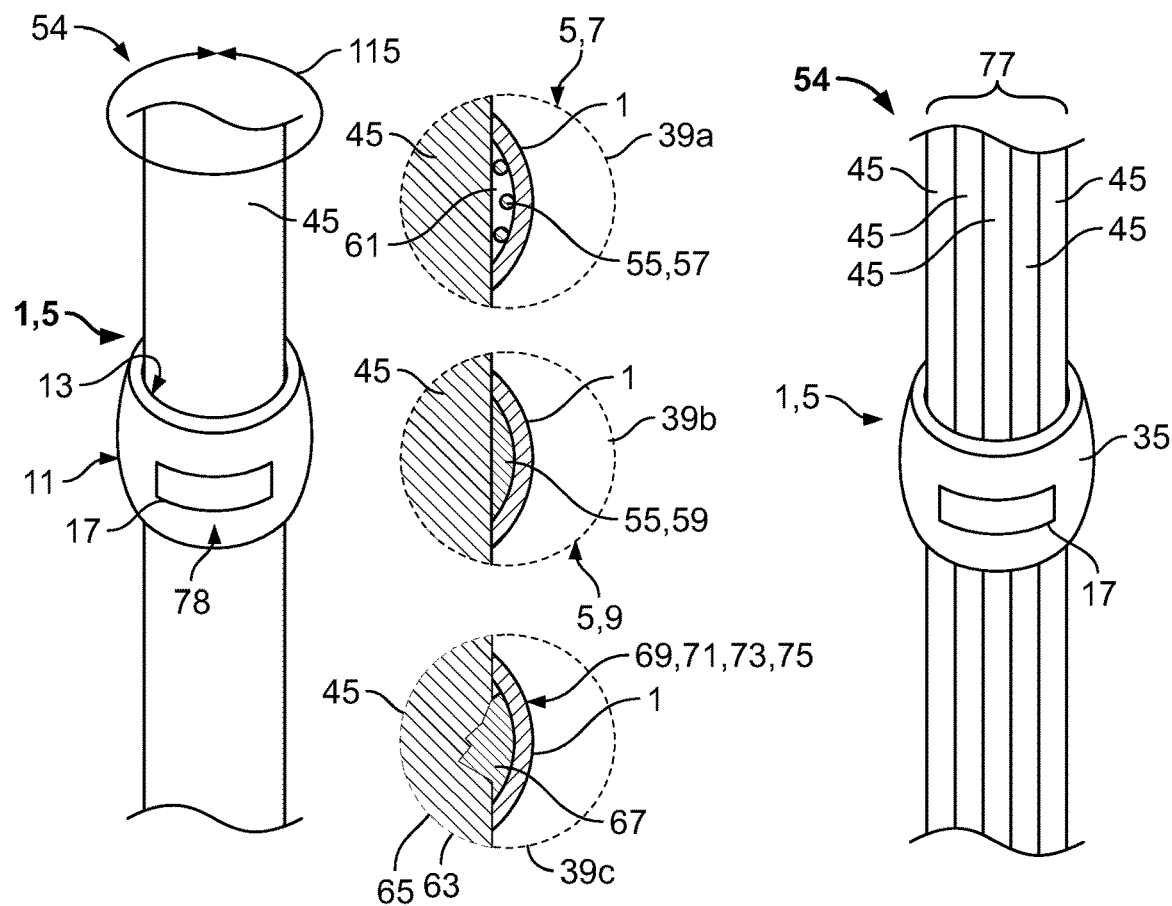
Fig. 3a
Fig. 3b
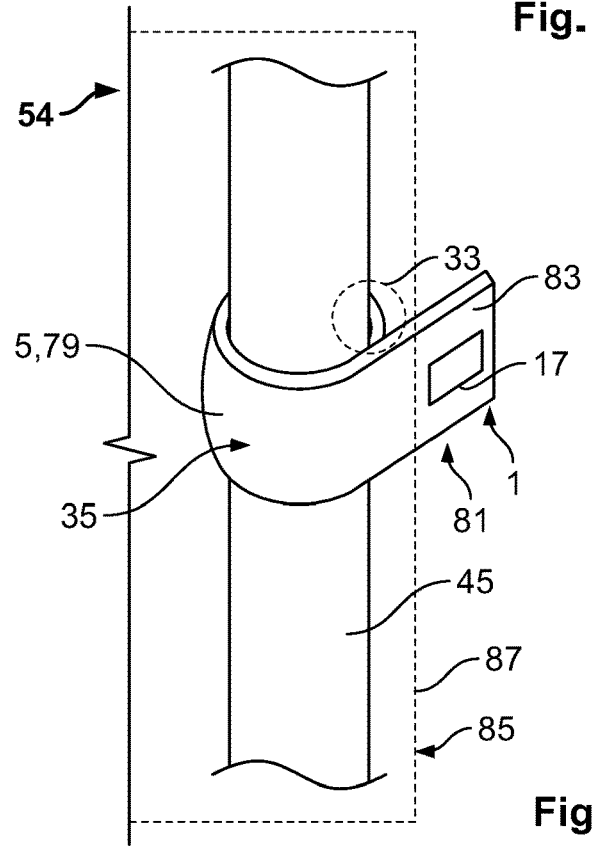
Fig. 3c

BISTABLE AUTOMATIC CABLE WRAP, KIT AND ASSEMBLY FOR WRAPPING, MARKING OR PATCHING

CROSS-REFERENCE TO RELATED APPLICATIONS

This application is a continuation of PCT International Application No. PCT/EP2019/061163, filed on May 1, 2019, which claims priority under 35 U.S.C. § 119 to European Patent Application No. 18170422.2, filed on May 2, 2018.

FIELD OF THE INVENTION

The present invention relates to a cable wrap and, more particularly, to a bistable automatic cable wrap for being wrapped around a cable or wire.

BACKGROUND

Cable wraps are widely applied to temporarily or permanently provide a cable marker that allows the type and/or functionality of the marked cable to be indicated. Furthermore, cable repair patches are also known, which allow damaged cable insulation to be repaired. The solutions in the art require a sequence of steps for their application, which requires skilled handling by the user and is time-consuming.

SUMMARY

A bistable automatic cable wrap for being wrapped around a cable or wire has a stable extended state in which the bistable automatic cable wrap extends essentially along a longitudinal direction. The bistable automatic cable wrap automatically adopts a stable wound state if deformed in the extended state.

BRIEF DESCRIPTION OF THE DRAWINGS

The invention will now be described by way of example with reference to the accompanying Figures, of which:

FIG. 1b is a side view of the cable wrap of FIG. 1a;

FIG. 3a is a perspective view of a cable wrap according to an embodiment on a cable;

FIG. 3b is a perspective view of a cable wrap according to an embodiment on a plurality of cables;

FIG. 3c is a perspective view of a cable wrap according to another embodiment on a cable;

FIG. 5b is a sectional end view of the cable wrap of FIG. 3a;

DETAILED DESCRIPTION OF THE EMBODIMENT(S)

Figure 1A:
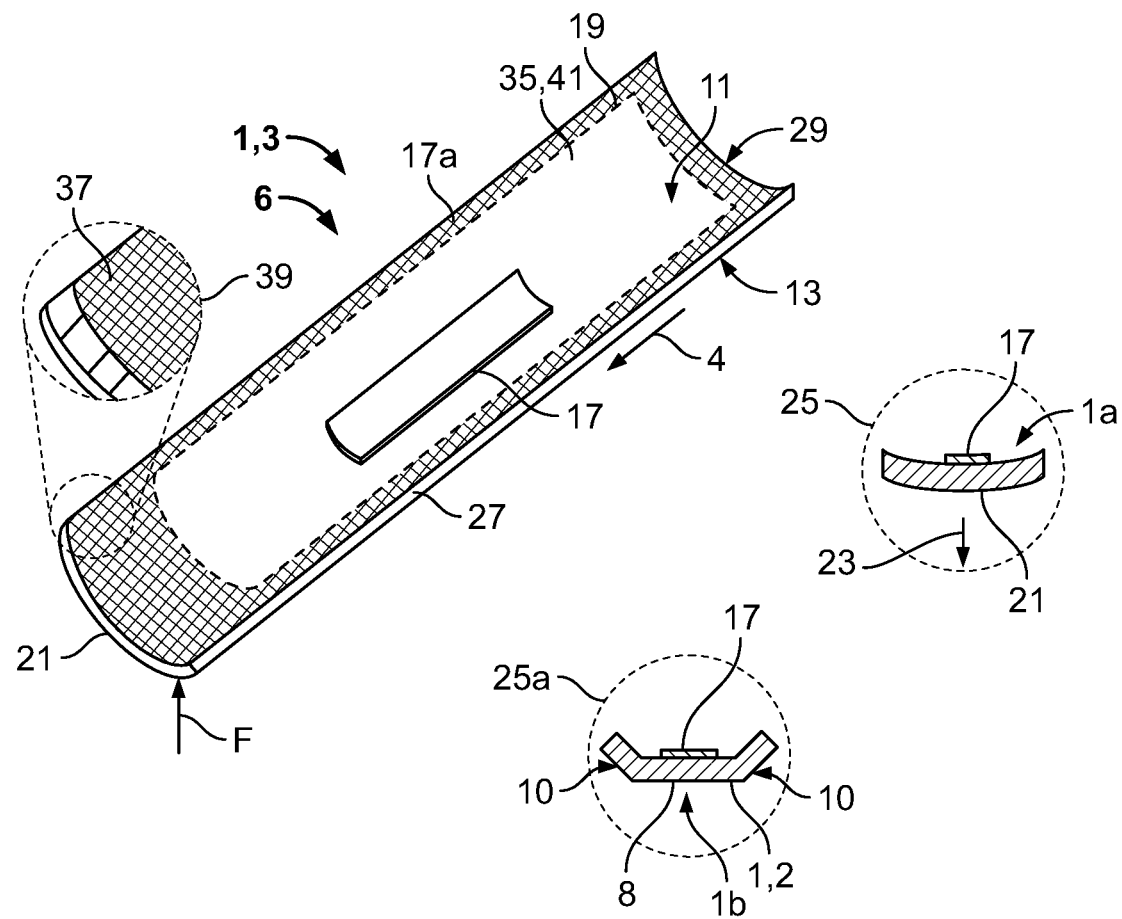
FIG. 1a is a perspective view of a cable wrap according to an embodiment in an extended state.

In the following, the invention will be described by way of example using the accompanying figures. Individual technical features of the embodiments shown may be arbitrarily combined with each other or omitted. The embodiments shown in the figures are purely exemplary. Similar technical features and technical features having the same technical effect will be denoted using the same reference numeral. A repetitive description will be avoided, whereby differences between different embodiments will be explicitly detailed.

Figure 1B:
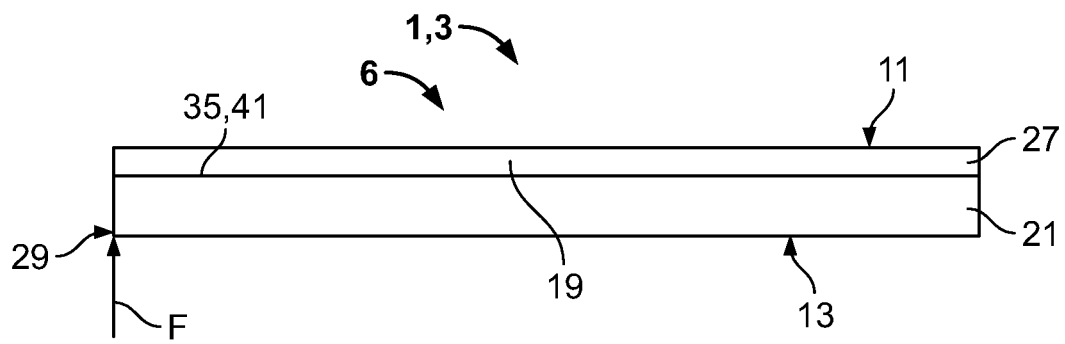

In each of FIGS. 1a, 1b, 2a, 2b, 3a and 3b, a bistable automatic cable wrap 1 according to the invention is shown. In FIGS. 1a and 1b, the cable wrap 1 is shown in an extended state 3 in a perspective view (FIG. 1a) and a side view (FIG. 1b). In the extended state 3, the cable wrap 1 extends in a longitudinal direction 4.

In FIGS. 2a, 2b, 3a and 3b the cable wrap 1 is shown in a wound state 5. The wound state 5 may correspond to a pre-assembled state 7 or to an assembled state 9. The latter two will be described below in a more detailed description of FIGS. 3a-3c.

FIGS. 1a, 1b, 2a and 2b show a solid cable wrap 1 which is embodied monolithically. The cable wrap 1 has a front side 11 and a back side 13, wherein in the wound state 5 the back side 13 faces towards an encircled volume 15. In different embodiments of the inventive cable wrap 1, a body 35 of the cable wrap 1 may have a structured body 37 as shown in circle 39. In the embodiment shown in the figures, the body 35 is made of a metal 41. The cable wrap 1 may, however, be made of a polymer. The inventive cable wraps 1 made of a polymer, in an embodiment, are adapted to be non-repetitively used for marking a cable or wire 45, whereas a cable wrap 1 according to the invention that is intended for repetitive use is made of metal 41 in an embodiment.

The front side 11 comprises an indication member 17. In FIG. 1a, a second embodiment of the indication member 17a is indicated with a dashed line. The indication member 17 may be provided in different sizes and may cover the entire cable wrap 1 in an embodiment. The indication member 17 may comprise an illuminating material and/or a fluorescent material. The indication member 17 provided at the cable wrap 1 may cover only a part of the cable wrap 1, such as a central part, wherein, in different embodiments, the indication member 17 may cover an entire side of the cable wrap 1.

The cable wrap 1 of the embodiment shown in FIG. 1a is made of a sheet metal 19 which may be pre-tensioned, such that, in the extended state 3, a convex portion 21 is provided which extends away from the front side 11 in a height direction 23 away from side edges 27 of the cable wrap 1. The height direction 23 is shown in a cut view 25 of FIG. 1a.

The cut is performed at a position of the indication member 17, such that the indication member 17 is also shown in the cut view 25.

In an embodiment, the bistable automatic cable wrap 1 may have a material thickness between 0.1 and 0.7 mm. In another embodiment, a thickness of the cable wrap 1 may be between 0.7 mm and 1.0 mm, or even more than 1.0 mm.

In FIG. 1a, another cut view 25a is shown, which shows a second embodiment 2 of the bistable automatic cable wrap 1. This second embodiment 2 does not comprise a curved shape 1a of the first embodiment, but rather an angled shape 1b. The automatic cable wrap 1 of the angled shape 1b has a flat base 8 and two wing portions 10. In the shown embodiment, the wing portions 10 extend towards the same side of the flat base 8. Further shapes with a plurality of edges and/or curved portions are conceivable, wherein all said embodiments may have in common that one side is essentially concave, while the opposite side is essentially convex.

In the side view of FIG. 1b, a curvature 29 of the convex portion 21 is deliberately exaggerated for the purposes of illustration. The cable wrap 1 is stable in the extended state 3, as well as in the wound state 5; the states in which the cable wrap 1 is stable may each be referred to as a stable state 6.

Figure 2A:
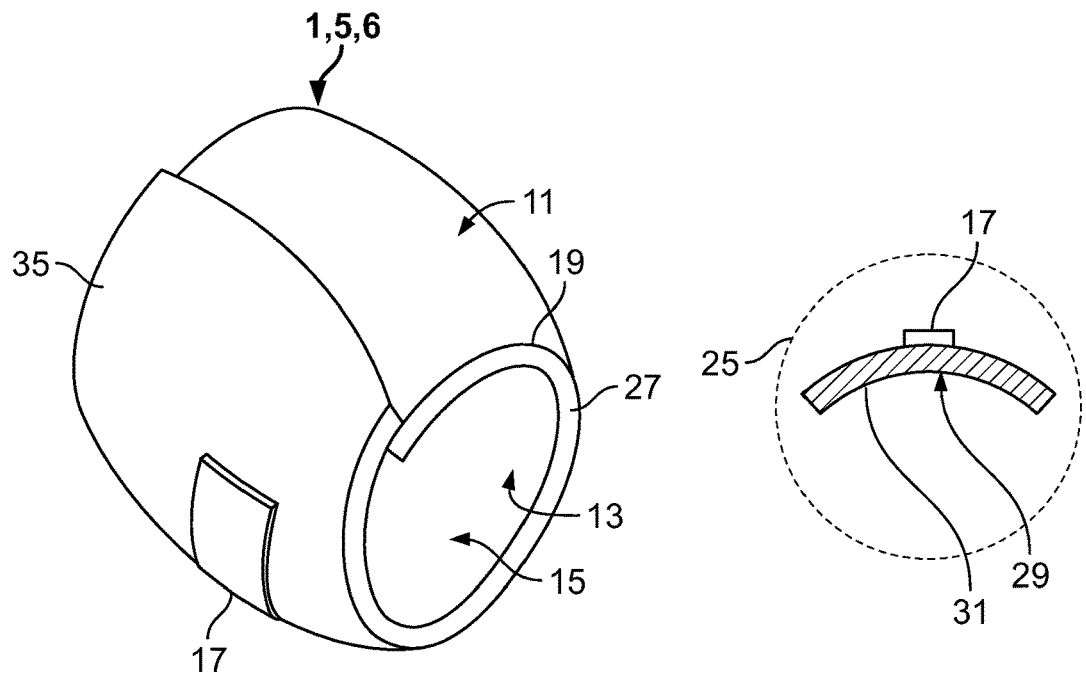
FIG. 2a is a perspective view of the cable wrap of FIG. 1a in a wound state.

Upon exertion of a force F in a direction counter to the height direction 23, shown in FIG. 1a, the force F at least partially deforming the cable wrap 1, the cable wrap 1 automatically adopts the wound state 5, in which the curvature 29 of the cable wrap 1 in the extended state 3 is inverted as indicated in the cut view 25 of FIG. 2a. The curvature 29 of the cable wrap 1 has a concave portion 31 in the wound state 5. The cable wrap 1 may, at least in the extended state 3, have a U-shaped profile if cut along a plane oriented essentially perpendicular to the longitudinal direction. Such a U-shaped profile may invert its curvature when it adopts the wound state 5.

A deformation of the cable wrap 1, as required to automatically adopt the stable wound state 5, may be understood as a force exerted on the cable wrap 1, in particular to deform at least a portion, e.g. a trigger portion or surface, thereof. Upon deformation, the bistable automatic cable wrap 1 starts to coil up. In an embodiment, such a deformation may be applied repetitively. Such an embodiment of the inventive cable wrap 1 is reusable.

In the wound state 5, the diameter of the wound cable wrap 1 may be defined by the cable or wire 45 around which the cable wrap 1 is attachable. In the wound state 5, the cable wrap 1 may exert a force on a cable or wire 45 to which it is attachable, wherein the force is directed radially inwards. In certain applications, the cable wrap 1 may have a minimum diameter which equals the outer diameter of the cable or wire 45. The minimum diameter corresponds to the diameter which is obtained if the cable wrap 1 is wound without a cable or wire 45.

Figure 2B:
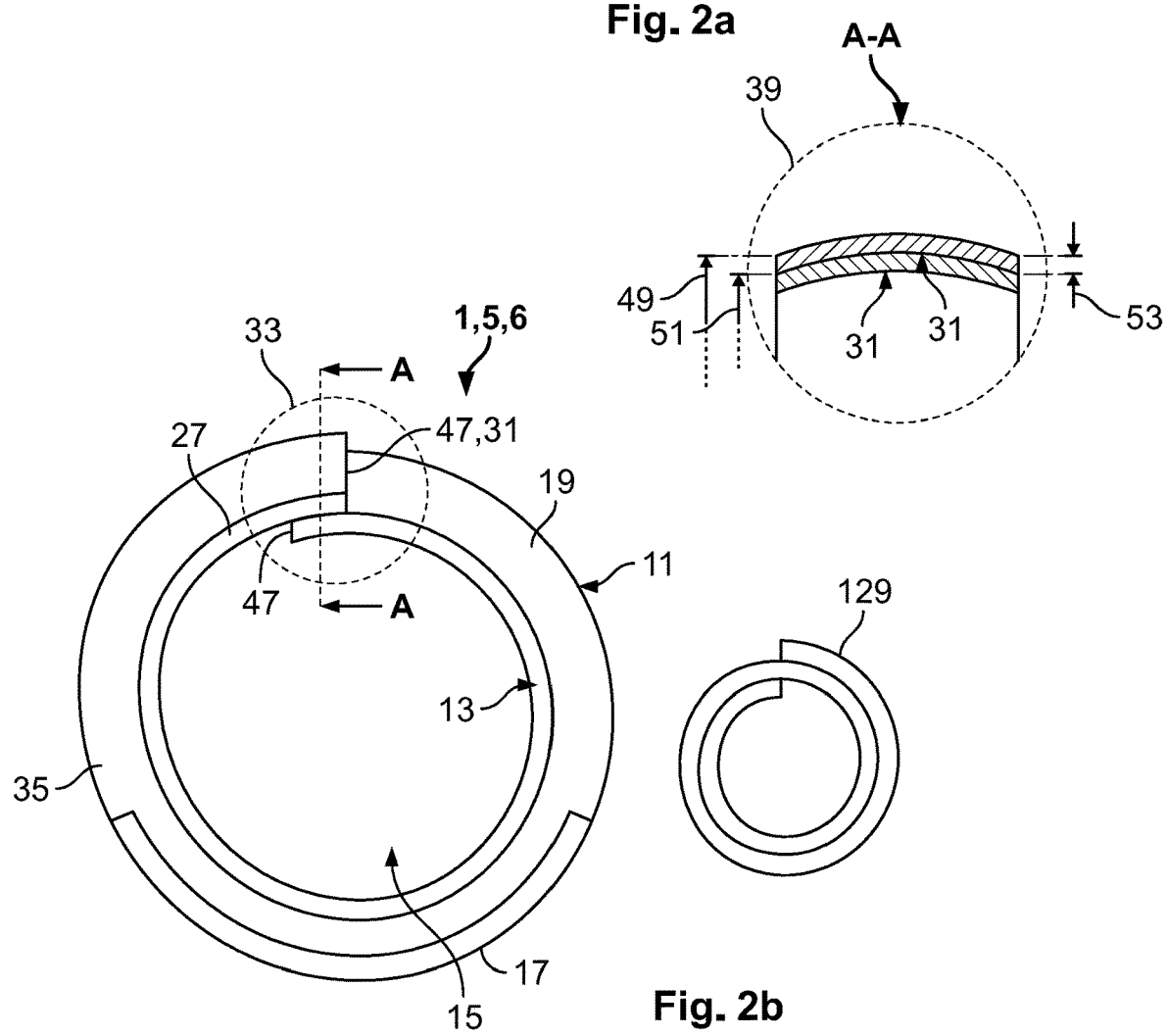
FIG. 2b is an end view of the cable wrap of FIG. 1a in the wound state.

In FIG. 2b, an overlap portion 33 is shown, wherein the cable wrap 1 may cover at maximum two turns 129 which is shown next to the figure. In the overlap portion 33 shown here, two ends 47 do partially enclose one another due to their concave portion 31. This is shown in circle 39 in FIG. 2b, which shows a cut along A-A. In an embodiment, the two concave portions 31 of a first end 47a and a second end 47b abut each other. Thus, a maximum diameter 49, indicated in the circle 39, corresponds to a single turn diameter 51 which is merely increased by a material thickness 53. This partial enclosing is only shown in the circle 39 of FIG. 2b.

FIGS. 3a, 3b and 3c show exemplary assemblies 54, which are respective applications of the cable wrap 1. The assemblies 54 comprise at least one cable or wire 45 and a cable wrap 1 according to the invention, wherein the cable wrap 1 is wound around the at least one cable or wire 45, and a length 113 (see FIG. 4b) of the cable wrap 1 corresponds at least to a circumference 115 of the assembly 54. It is to be noted that the circumference 115 is not limited to a circular shape, but may also be understood as the perimeter of a rectangular or a polygonal shaped cable 45. The cable wrap 1 may be wrapped around a cable or wire 45 of any arbitrary shape or diameter.

FIG. 3a shows an inventive cable wrap 1 which is used for permanently marking the cable or wire 45. The cable wrap 1 is in the wound state 5 and wound around the cable 45. On the front side 11, the indication member 17 is shown and visible to a user. The back side 13 faces towards the cable 45 and has an adhesive material 55. In a first circle 39a, the adhesive material 55 is in an unheated state 57 and solely attached to the cable wrap 1. The cut view shown in the first circle 39a is a pre-assembled state 7 of the cable wrap 1. When heat is applied to the cable wrap 1 shown in FIG. 3a, the adhesive material 55, in particular a hot melt adhesive 59, melts, fills remaining gaps 61 between the cable 45 and the cable wrap 1 and glues the cable wrap 1 to the cable 45. The assembled state 9 is shown in a second circle 39b of FIG. 3a.

In a third circle 39c of FIG. 3a, a further embodiment of the inventive cable wrap 1 is shown, which is used for patching the cable or wire 45. The cable 45 has a damaged portion 63 in its insulation 65. The cable wrap 1 has an adhesive repair material 67 which behaves similarly as the hot melt adhesive 59 described above, wherein the adhesive repair material 67 is additionally configured to bond chemically and/or physically with the cable insulation 65. The cable wrap 1 in circle 39c therefore repairs the insulation 65 and protects the cable 45 against environmental influences. The cable wrap 1 may thus provide a waterproof connection 69, an electrically isolating connection 71, as well as a self-laminating connection 73 and a self-adhesive connection 75. The connections 69, 71, 73, 75 may be present in an arbitrary combination, such that, exemplarily, a laminating connection 73 may be waterproof 69 or an adhesive connection 75 may be electrically isolating 71.

In FIG. 3b, an inventive cable wrap 1 is wound around a plurality 77 of cables 45. The indication member 17 may thus be used, for example, for indicating a functionality of the plurality 77 of cables 45.

The cable wrap 1 may be applied as a reusable cable marker 78, shown in FIG. 3a, or a permanently fixed cable wrap 1. In FIGS. 3a and 3b, the overlap portion 33 is located behind the cable 45 or the plurality 77 of cables 45, and is thus not visible.

In FIG. 3c, the inventive cable wrap 1 is shown in a further embodiment, in which a wrap portion 79 rather than the entire body 35 is wound around the cable 45. The cable wrap 1 has an indicator portion 81, which is embodied as a flat sheet part 83 and which comprises the indication member 17. The flat sheet part 83 does remain in an extended state 3 and does not adopt a wound state 5, whereas the wrap portion 79, which is shown in the wound state 5 in FIG. 3c, may adopt both stable states 3, 5. This embodiment has the advantage that a cable 45 may be recessed in a module 85 and still be properly marked. The cable 45 itself may not be visible to a user, whereas the indicator portion 81 may extend beyond the cubage 87 (indicated by a dashed line) of the module 85. For ease of printing, the cable wraps 1 may be aligned in the same direction as the flat sheet 83.

Figure 4A:
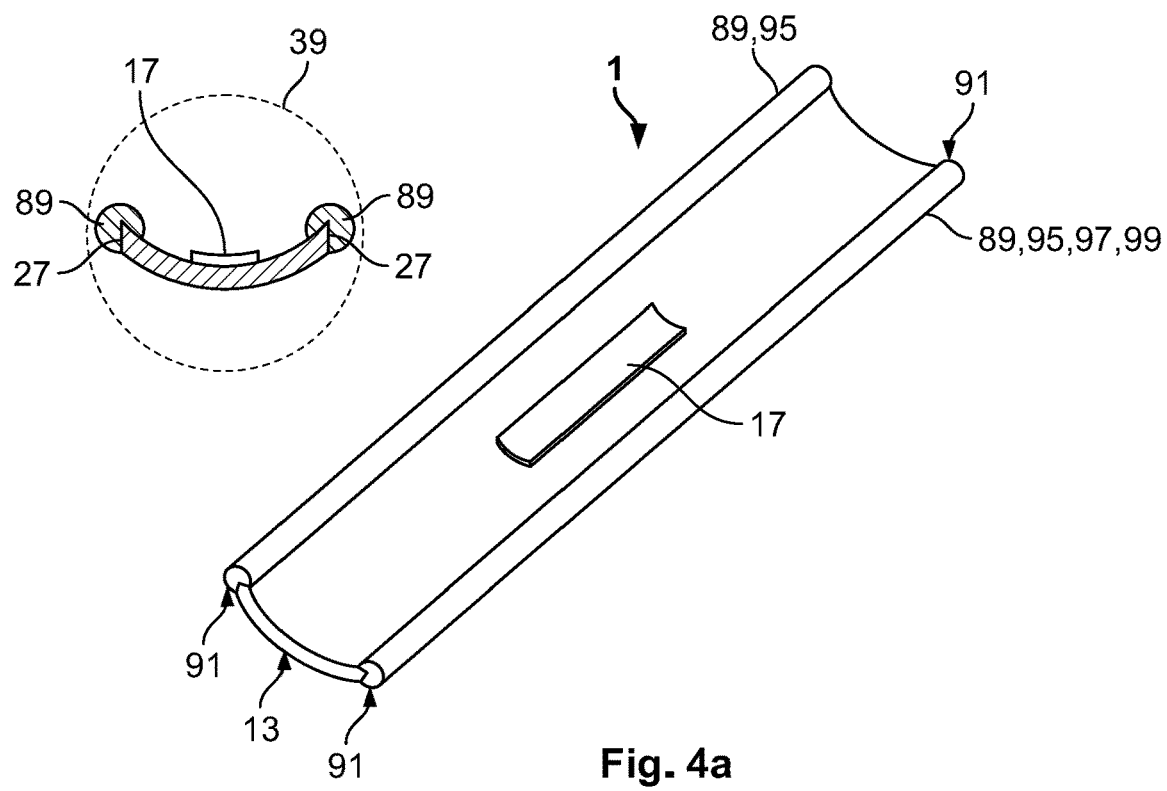
FIG. 4a is a perspective view of a cable wrap according to another embodiment.
Figure 4B:
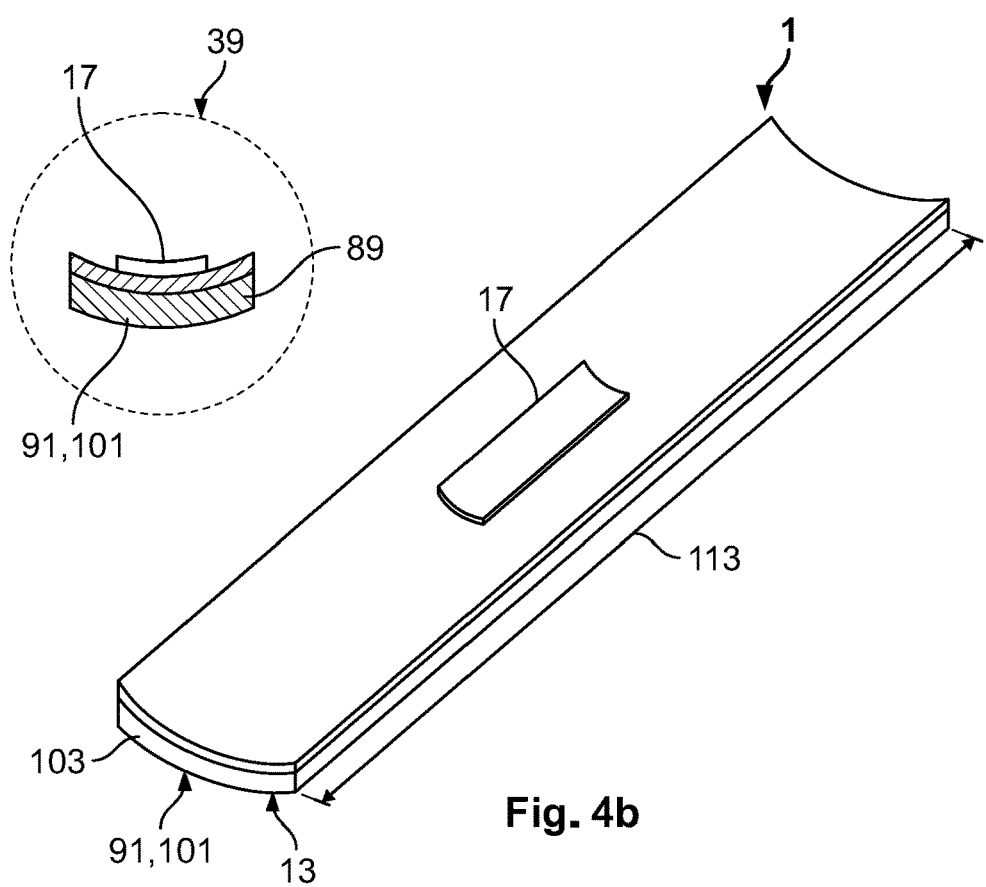
FIG. 4b is a perspective view of a cable wrap according to another embodiment.

FIG. 4a and FIG. 4b show a second and third embodiment of the inventive cable wrap 1. Both embodiments comprise a surface 91 which increases friction between cable wrap 1 and wire 45. The surface 91 is at least partially embodied at the back side 13 of the cable wrap 1.

Such a surface 91 may be embodied as a partial cover member 89. The partial cover member 89 may be an edge cover 95 which extends along the side edges 27 of the cable wrap 1 and may be made of rubber 97 or other suitable friction increasing material 99, as shown in FIG. 4a. In FIG. 4b, the surface 91 is embodied as a surface cover 101 covering the entire back side 13 of the cable wrap 1. The surface cover 101 may be partially elastic and comprise a foam material 103 which may, on the one hand, increase friction between the cable wrap 1 and the cable 45 and, on the other hand, adapt to a possibly uneven surface of the cable 45 or the plurality 77 of cables 45.

Figure 5A:
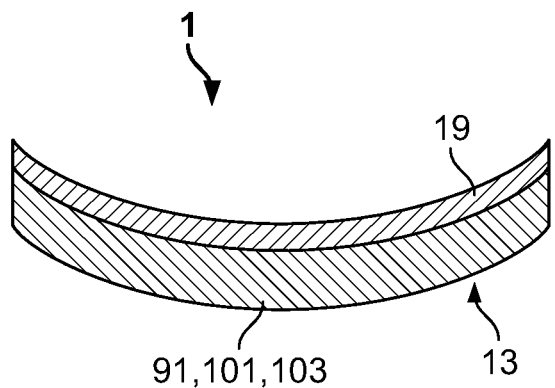
FIG. 5a is a sectional end view of the cable wrap of FIG. 4b.
Figure 5B:
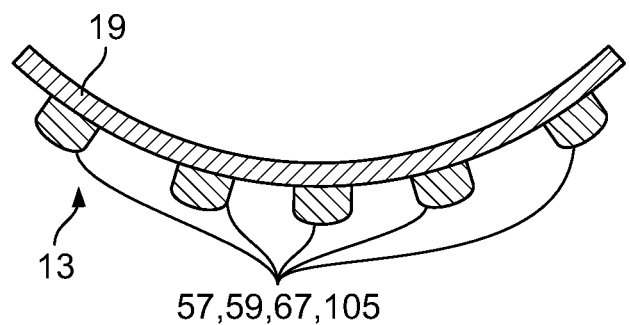

FIG. 5a shows a larger cross-section of the cable wrap 1 of FIG. 4b, and FIG. 5b shows a cut view of the embodiment of the inventive cable wrap 1 indicated in the first circle 39a of FIG. 3a. The two embodiments are sheet metal parts 19, while the back side 13 is provided either with the foam material 103 or with the hot melt adhesive 59 or the adhesive repair material 67 in the unheated state 57. The hot melt adhesive 59 or the adhesive repair material 67 is provided in the form of drops 105 at the back surface 13.

Figure 6A:
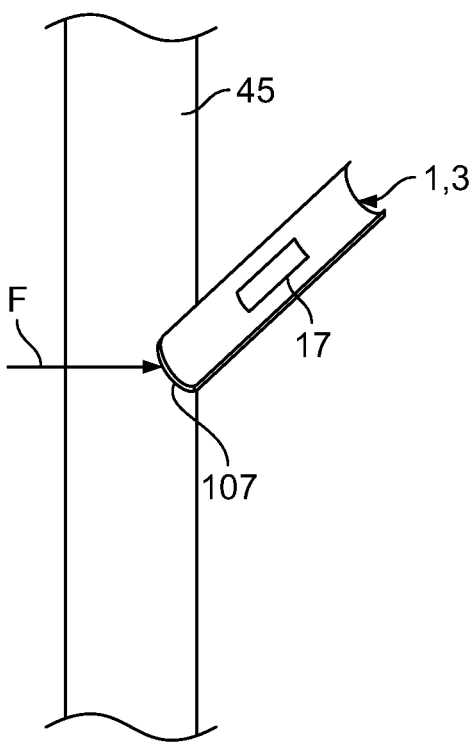
FIG. 6a is a perspective view of a first step of a process of applying a cable wrap according to an embodiment to a cable.
Figure 6B:
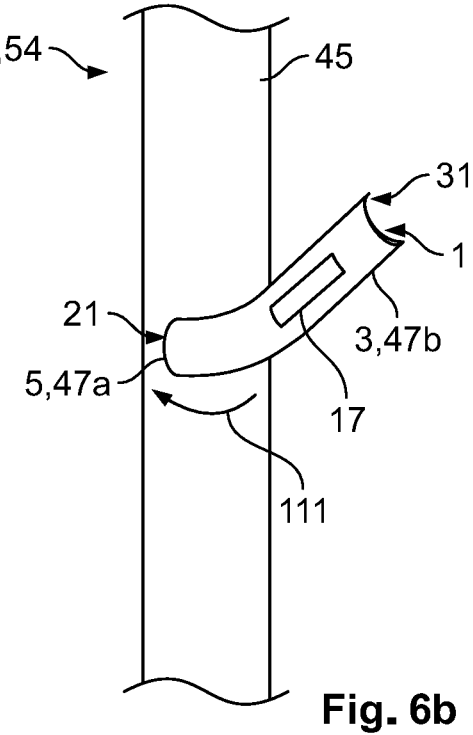
FIG. 6b is a perspective view of a second step of the process of applying the cable wrap of FIG. 6a to the cable.

FIGS. 6a and 6b show two process steps for applying the inventive cable wrap 1 to a cable or wire 45 for obtaining the inventive assembly 54. In the first step shown in FIG. 6a, the cable wrap 1 is in the extended state 3 and approached to the cable 45. When a force F is exerted from the cable 45 on a trigger portion 107 (the entire back side 13 may be the trigger portion 107), the cable wrap 1 adopts the wound state 5. In the wound state 5, the cable wrap 1 may at least partially encircle the trigger portion 107. In the wound state 5, the back side 13 of the cable wrap 1 may be located inside the circle/cylinder which is formed by the cable wrap 1.

In FIG. 6b the intermediate state 109 of the cable wrap 1 is shown, in which only the first end 47a is in the wound state 5, while the second end 47b is still in the extended state 3. However, this intermediate state 109 is not stable and the cable wrap 1 will automatically adopt the wound state 5, which is indicated by a winding direction 111 that indicates the movement performed by the cable wrap 1. It is furthermore noted in the state shown in FIG. 6b that the first end 47a has a convex portion 21 and the second end 47b a concave portion 31. After the step shown in FIG. 6b, the assembly 54 adopts a state similar to the one shown in FIG. 3a.

The extended state 3 may be considered a metastable state, in which a disturbance having energy smaller than the potential energy of the metastable state will change the cable wrap 1 state into the wound state 5. Contrary to the metastable extended state 3, the wound state 5 may be considered the state of least energy of the bistable automatic cable wrap 1.

Figure 7:
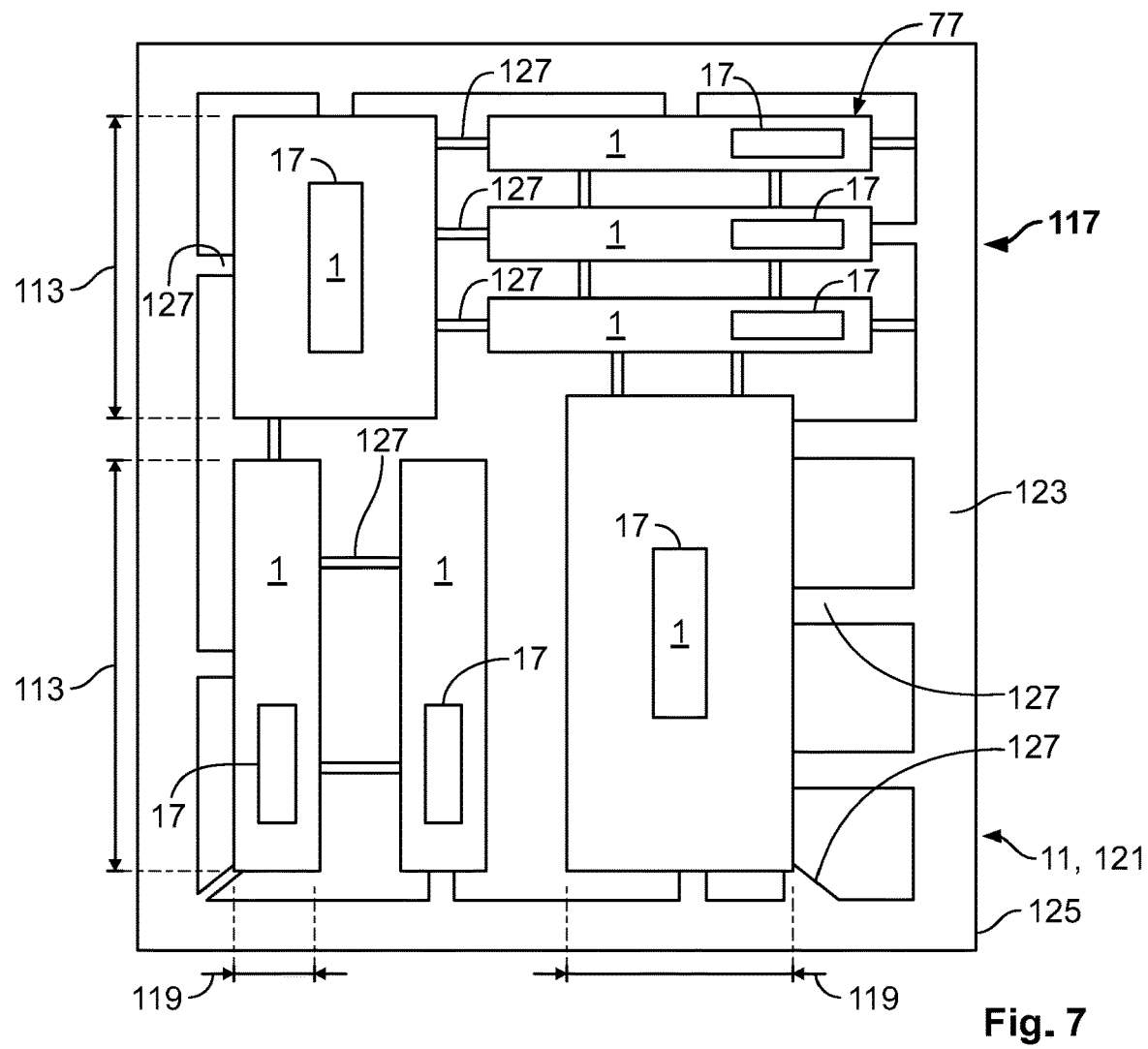
FIG. 7 is a plan view of a kit according to an embodiment.

FIG. 7 shows a kit 117 according to an embodiment which comprises a plurality 77 of the inventive cable wraps 1 of different lengths 113 (only two lengths 113 are indicated) and/or widths 119. Each of the cable wraps 1 may comprise an indication member 17, wherein the front side 11, which is visible in FIG. 7, may have a flatness 121 which allows printing of the indication members 17. The different cable wraps 1 are arranged in a matrix 123 that comprises a supporting frame 125 surrounding the matrix 123 and supporting bars 127 connecting the cable wraps 1 with each other and the cable wraps 1 to the supporting frame 125. In FIG. 7, not all supporting bars 127 are indicated with a reference numeral. The kit 117 may be adapted to be placed in a common printer or labeling apparatus for modifying the indication member 17 such that information may be provided on said indication member 17. Possible processes include etching, engraving, deposition techniques or printing.

The length of the cable wrap 1 may be limited by choosing a cable wrap 1 from the kit 117 having an appropriate length 113. By choosing an appropriate length, limiting the cable wrap 1 to at most two turns about the cable 45, excess material may be reduced and the assembly may not become larger than the space in which it is installed, even though the necessary space is increased by the cable wrap 1 which is wound around the cable or wire 45.

Figure 8:
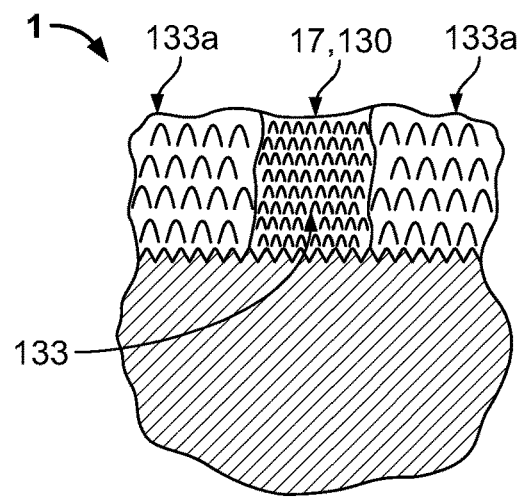
FIG. 8 is a sectional side view of an indication member of a cable warp according to an embodiment.
Figure 9:
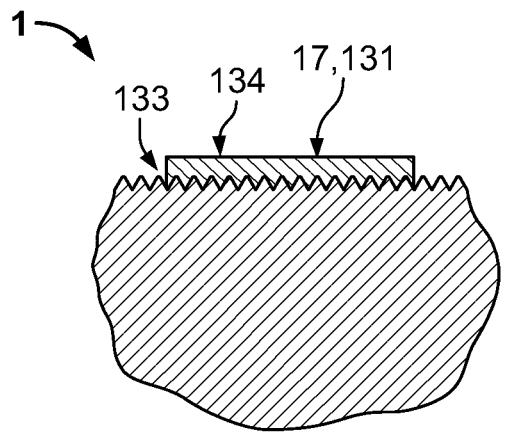
FIG. 9 is a sectional side view of an indication member of a cable warp according to another embodiment.
Figure 10:
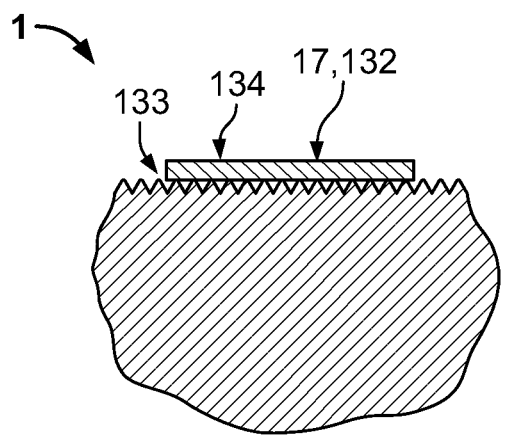
FIG. 10 is a sectional side view of an indication member of a cable warp according to another embodiment.

In FIGS. 8 to 10, possible embodiments of the indication member 17 are shown. The figures each show a surface structure 133 whose dimensions are exaggerated for the purposes of explanation only.

In FIG. 8, a section of the inventive bistable automatic cable wrap 1 is shown in a cut perspective view. The indication member 17 comprises a homogenously smooth surface 130 which is characterized by an even height of the surface structure 133. The surface structure 133 is furthermore independent of the direction along which it is viewed on the bistable automatic cable wrap 1. Such a homogenously smooth surface 130 is in contrast to the untreated surface structure 133a which comprises an unevenly rough surface being unisotropic, i.e. dependent on the direction along which it is considered.

A homogenously smooth surface 130 is to be understood as a surface of the bistable automatic cable wrap 1 which may still comprise a surface roughness, wherein the roughness as well as the structure of the surface are isotropic, i.e. uniform in all directions along the surface. Such a homogenously smooth surface 130 may, for instance, be used for laser marking which applies a laser beam, as well as for continuous inkjet printing. In the latter method, the ink is deposited at a high velocity and neither marking technique requires a mechanical contact with the bistable automatic cable wrap 1. Thus, the bistable automatic cable wrap 1 may be of any thickness and the corresponding surface of the indication member 17 may also be rough. In an embodiment, thermal transfer printers may be applied to print or write onto the homogenously smooth surface 130 of the indication member 17. In such thermal transfer printers, the bistable automatic cable wrap 1 may be compressed during the printing operation which is carried out under an applied pressure. The material thickness of the above-described embodiment of the bistable automatic cable wrap 1 easily allows the slightly curved cable wrap 1 to be compressed during printing.

In FIG. 9, the bistable automatic cable wrap 1 is provided with a preparation coating 131 which is neatly attached to the surface structure 133 of the cable wrap 1. The preparation coating 131 is thus complementarily arranged along the surface structure 133, thereby forming a printing or labeling surface 134 having a higher and more homogenous adhesion to acrylic or water-based ink than the surface structure 133. The preparation coating 131 may be understood as a liquid or gel which may be applied to the surface of the indication member 17 and which bonds to the indication member 17 by physical and/or mechanical processes. The surface structure 133 provides a sufficient hardness so as not to be easily removed by friction, while at the same time providing a flexible surface. The coating 131, in an embodiment, is water resistant and adapted for absorbing acrylic or water-based inks.

FIG. 10 shows a printing or writing substrate 132 which is placed above the surface structure 133 of the cable wrap 1. The printing or writing substrate 132 also provides a printing or labeling surface 134 with similar properties to the one shown in FIG. 9. The printing or writing substrate 132 may, for instance, be glued to the surface structure 133 and is thus, in contrast to the preparation coating 131 of FIG. 9, not formed complementarily to the surface structure 133. The printing or wiring substrate 132 absorbs water-based or acrylic inks in an embodiment. A bistable automatic cable wrap 1 with such a printing or writing substrate 132 may be adapted so that it is printable using an inkjet or laser printer, in particular a roll-to-roll inkjet label printer.

The area available for printing and/or labeling the indication member 17 may solely be limited by the indication member 17 itself. As described above, printing and/or labeling may therefore be performed in only a part of the cable wrap 1, such as a central part, or over an entire side of the cable wrap 1 if the indication member 17 is embodied as such. If the previously described bistable automatic cable wrap 1 has an angled shape, the indication member 17 is positioned at or on the flat base 8.

Figure 11:
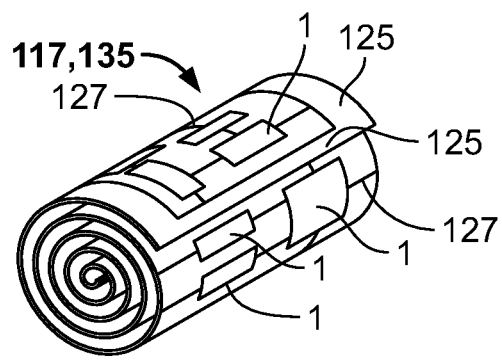
FIG. 11 is a perspective view of a kit according to another embodiment.

FIG. 11 shows another embodiment of the inventive kit 117. The kit 117 is in the form of a roll product 135 suitable for roll-to-roll printing. The structure of each layer of the roll product 135 is similar to the one shown in FIG. 7, i.e. it comprises different cable wraps 1 (not all of which are indicated using reference numerals), a supporting frame 125 and supporting bars 127.

The inventive bistable automatic cable wrap 1, kit 117, and assembly 54 have the advantage of an easier and faster installation which does not require additional means for fixing the cable wrap 1 prior to reaching a final installation position. The ease of use furthermore reduces the risk of a faulty or incomplete installation of the cable wrap 1. The inventive solutions furthermore have the advantage that they are self-aligning during application and do not need to be held in place when being installed. Furthermore, the inventive solutions as less craft-sensitive when being installed. Additionally, no clamp or tape is needed to hold the inventive cable wrap 1 in place as it automatically self-winds around a cable or wire 45 and holds itself in place.

In certain technical fields, e.g. in the railroad industry, there is a need for reliable cable markers 78 which allow for repositioning of the marker 78. It is desired that a label indicating the type and/or functionality of the marked cable 45 faces towards the user. If this orientation is not set after the installation of the inventive cable wrap 1, it may easily be relocated along an extension of the cable 45 or rotated around the extension of the cable 45 in order to obtain the desired position.

What is claimed is:

1. A bistable automatic cable wrap for being wrapped around a cable or wire, comprising:
   a stable extended state in which the bistable automatic cable wrap extends essentially along a longitudinal direction, the bistable automatic cable wrap automatically adopts a stable wound state if deformed in the extended state; and
   an adhesive material on a back side of the bistable automatic cable wrap.

2. The bistable automatic cable wrap of claim 1, wherein a front side of the bistable automatic cable wrap has an indication member for labeling the cable or the wire around which the bistable automatic cable wrap is attachable.

3. The bistable automatic cable wrap of claim 2, wherein the indication member has a homogenously smooth surface.

4. The bistable automatic cable wrap of claim 2, wherein the indication member has a preparation coating adhesively attached to the indication member and providing a higher adhesion to liquid inks than non-porous materials of the bistable automatic cable wrap.

5. The bistable automatic cable wrap of claim 2, wherein the indication member has a layer of writing or printing substrate adhesively fixed to the indication member for absorbing water-based or acrylic inks.

6. The bistable automatic cable wrap of claim 2, wherein the front side of the bistable automatic cable wrap is essentially flat in the extended state.

7. The bistable automatic cable wrap of claim 6, wherein the bistable automatic cable wrap has a material thickness between 0.1 and 0.7 mm.

8. The bistable automatic cable wrap of claim 1, wherein the extended state and the wound state are each repetitively and reversibly adoptable for applying the bistable automatic cable wrap as a reusable cable marker.

9. The bistable automatic cable wrap of claim 1, wherein the bistable automatic cable wrap is coiled at most two turns about the cable in the wound state.

10. The bistable automatic cable wrap of claim 1, wherein the adhesive material is an adhesive repair material configured to bond chemically and/or physically with a cable insulation.

11. The bistable automatic cable wrap of claim 10, wherein the adhesive repair material fills in a gap and/or a plurality of gaps of a damaged portion of the cable insulation.

12. The bistable automatic cable wrap of claim 1, wherein the bistable automatic cable wrap is made of a metal and/or a polymer.

13. A kit, comprising:
   a plurality of bistable automatic cable wraps according to claim 1, the plurality of bistable automatic cable wraps have different lengths and/or widths.

14. An assembly, comprising:
   at least one cable or wire; and
   a bistable automatic cable wrap having a front side and a back side, and a stable extended state in which the bistable automatic cable wrap extends essentially along a longitudinal direction and automatically adopting a stable wound state if deformed in the extended state, the back side has an adhesive material, the bistable automatic cable wrap is wound around the at least one cable or wire and a length of the bistable automatic cable wrap corresponds at least to a circumference of the assembly.

15. The assembly of claim 14, wherein a connection formed between the at least one cable or wire and the bistable automatic cable wrap is at least one of: a waterproof connection, an electrically isolating connection, a self-laminating connection, and a self-adhesive connection.

\* \* \* \* \*